United States Patent [19]
Yokotsuka

[11] Patent Number: 4,461,545
[45] Date of Patent: Jul. 24, 1984

[54] ZOOM LENS LOCKING SYSTEM
[75] Inventor: Akio Yokotsuka, Tokyo, Japan
[73] Assignee: Kino Precision Industries, Ltd., Tokyo, Japan
[21] Appl. No.: 331,121
[22] Filed: Dec. 16, 1981
[30] Foreign Application Priority Data
  Jul. 28, 1981 [JP] Japan .................. 56-111131[U]
[51] Int. Cl.³ .................. G02B 7/04; G02B 15/00
[52] U.S. Cl. ........................ 350/429; 350/255
[58] Field of Search .................. 350/429, 255
[56] References Cited
  U.S. PATENT DOCUMENTS
  3,277,783 10/1966 Eggert .................... 350/429
  3,970,368  7/1976 Von Belvard ............. 350/430
  3,970,370  7/1976 Kawai ..................... 350/255
  4,229,074 10/1980 Nonogaki ................. 350/429

Primary Examiner—John K. Corbin
Assistant Examiner—Rebecca D. Gass
Attorney, Agent, or Firm—Fulwider, Patton, Rieber, Lee & Utecht

[57] ABSTRACT

A locking system is provided for selectively locking the operating ring of a zoom lens against axial displacement to secure optical elements of the zoom lens in a selected position of magnification adjustment. The locking system comprises a ratchet carried by the operating ring and urged by a spring into locking engagement with a toothed rack mounted on the zoom lens housing to lock the operating ring in a selected axial position of adjustment. A control pin is movable upon depression of a spring-biased button to engage the ratchet and move it away from engagement with the toothed rack to permit axial displacement of the operating ring to an alternative magnification setting. In one embodiment of the invention, a lock-release switch selectively maintains the ratchet away from engagement with the rack.

25 Claims, 11 Drawing Figures

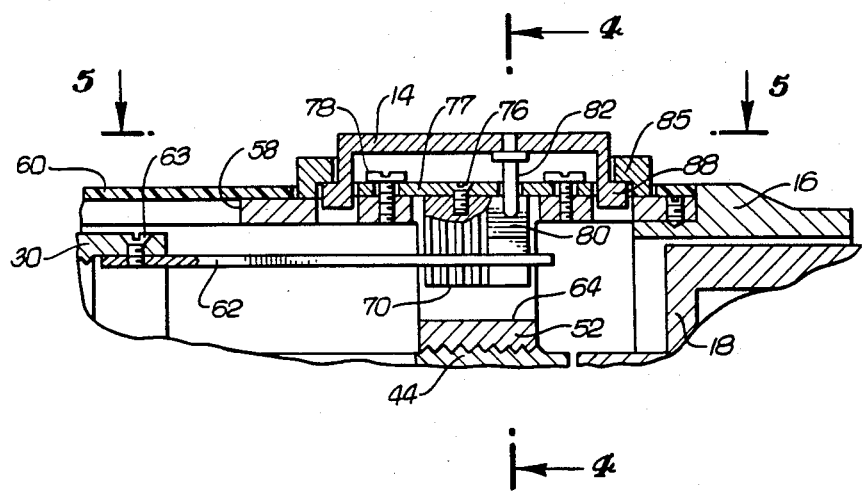
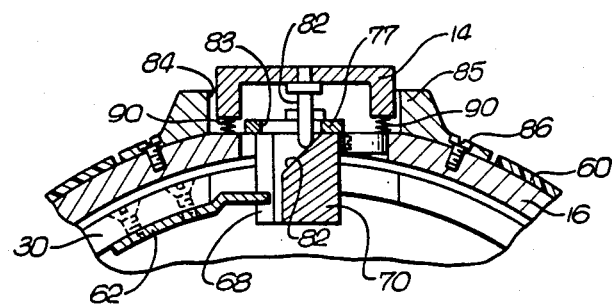
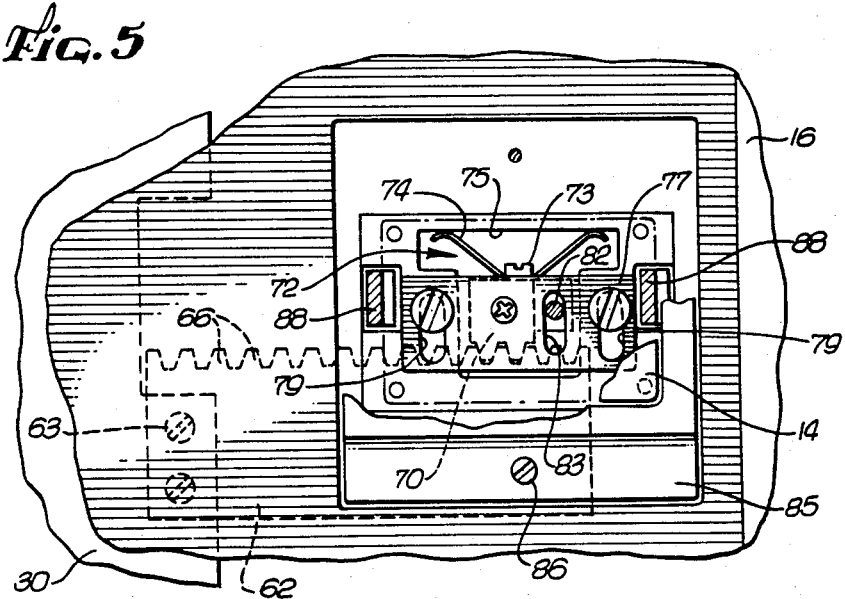

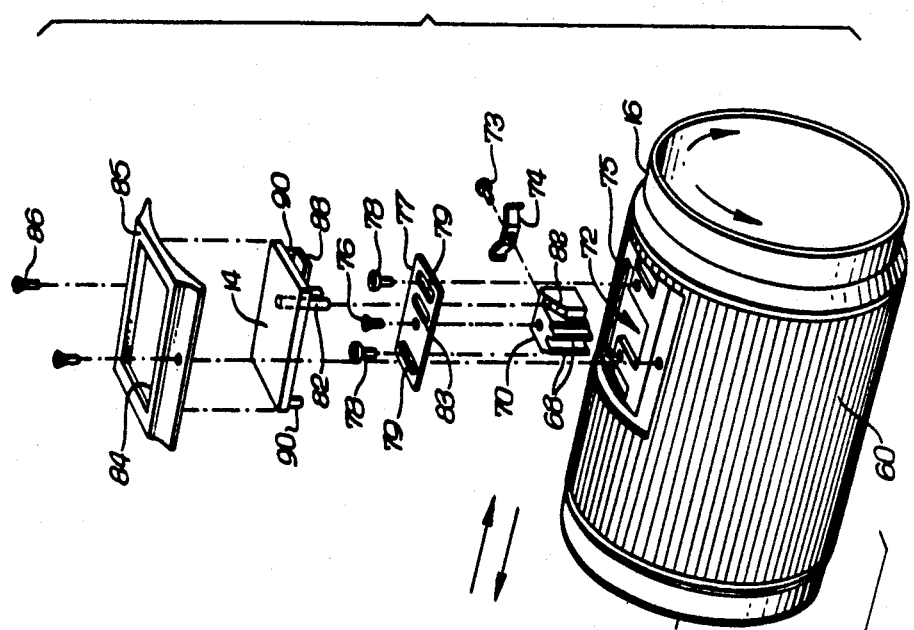
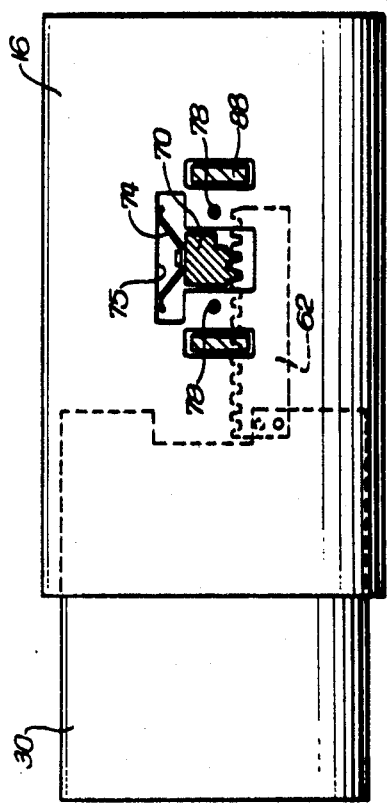

ZOOM LENS LOCKING SYSTEM

BACKGROUND OF THE INVENTION

This invention relates generally to improvements in photographic lenses of the type commonly referred to as a zoom lens wherein the lens is adjustable to select the magnification of the image being photographed. More particularly, this invention relates to a locking system for releasably locking the zoom lens in a selected magnification setting.

Zoom lenses in general are known in the art and typically comprise a plurality of optical elements mounted within a lens housing which is in turn adapted for mounting upon a camera. The optical elements of the zoom lens cooperate to provide a so-called telephoto lens capable of producing a relatively large image of a distant object. Importantly, the variou optical elements are mounted on different portions of the lens housing which are mechanically movable relative to one another to permit controlled adjustment of the image focus and the image magnification.

More specifically, in a typical zoom lens, the forwardmost optical element comprises a focusing element mounted for precisely controlled axial displacement in response to rotation of a revolving housing portion to adjust the image focus. At least one optical element positioned between the focusing element and the camera constitutes a zoom element movable in response to axial sliding motion of another portion of the lens housing. Both of these movements are commonly controlled by an operating ring carried about the lens housing for appropriate rotational movement to select image focus and axial sliding movement to select image magnification.

One problem encountered with prior art zoom lenses is that the operating ring tends to creep axially during use or handling of the camera, resulting in an inadvertent and undesired alteration of the magnification setting. For example, the weight of the zoom optical element is frequently sufficient to cause the operating ring to creep axially under the influence of gravity whenever the zoom lens is oriented angularly with respect to the horizontal plane. Moreover, the operating ring is easily displaced from its desired position of axial adjustment by bumping or by centrifugal forces as the lens is moved or carried about. The photographer must therefore hold the operating ring manually and/or repeatedly recheck and reset the magnification setting during use of the zoom lens.

The present invention overcomes the problems and disadvantages of the prior art by providing an improved zoom lens having a relatively inexpensive and simple locking system for releasably locking the operating ring in a selected position of axial adjustment to correspondingly lock the zoom lens in a selected magnification setting.

SUMMARY OF THE INVENTION

In accordance with the invention, a locking system for a zoom lens is provided for releasably locking the zoom lens in a selected magnification setting. The zoom lens includes a plurality of optical elements mounted within a lens housing, wherein at least one of the optical elements is a zoom element carried by an axially sliding housing portion to adjust the magnification of the photographic image. A first toothed locking member on the sliding housing portion is biased by a spring into engagement with a second toothed locking member on a nonsliding portion of the housing to lock the zoom element in position. A control pin is manually movable into engagement with the first toothed locking member to move it away from engagement with the second toothed locking member and thereby permit axial sliding movement of the zoom element to an alternative selected magnification setting.

According to a preferred form of the invention, the zoom lens comprises a fixed housing portion adapted for connection to a camera and a revolving housing portion carried by the fixed housing portion for revolving motion within a circumferential track to adjust the precise axial position of a focusing optical element at the front of the zoom lens. The zoom optical element is carried by the sliding housing portion between the focusing element and the camera for axial movement to adjust the magnification setting. An operating ring is mounted about the fixed housing portion for independent revolving movement to adjust the position of the revolving housing portion and axially sliding movement to adjust the position of the sliding housing portion.

The first toothed locking member is provided in the form of a ratchet mounted on the operating ring and biased by a spring into engagement with the second toothed locking member in the form of an axially extending rack mounted on the revolving housing portion. The ratchet is selectively moved out of locking engagement with the rack by the control pin which is carried by a spring-biased button on the operating ring. This button may be manually depressed to move the control pin against a cam surface on the ratchet to force the ratchet away from engagement with the rack. Accordingly, when the button is depressed, the operating ring can be displaced axially with respect to the fixed and revolving housing portions to alter the axial position of the zoom element and thereby adjust the magnification setting of the zoom lens. Once the desired magnification setting is selected, the button can be released to disengage the control pin from the ratchet and thereby permit the ratchet to return to locking engagement with the rack.

In accordance with further features of the invention, a lock-release switch is selectively operated to maintain the button in a depressed position with the control pin engaging the cam surface on the ratchet. In this position, the ratchet is maintained away from engagement with the rack to permit unrestricted axial sliding motion of the zoom element.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is an enlarged fragmented longitudinal section similar to FIG. 2 and illustrating construction details of the locking system;

FIG. 4 is a fragmented transverse vertical section taken generally on the line 4—4 of FIG. 3;

FIG. 5 is a fragmented plan view taken generally on the line 5—5 of FIG. 3 with portions broken away to illustrate further construction details of the locking system;

FIG. 6 is a fragmented plan view generally similar to FIG. 5 and illustrating still further construction details of the locking system;

FIG. 7 is an exploded perspective view illustrating assembly of the locking system with respect to the zoom lens;

DETAILED DESCRIPTION OF THE PREFERRED EMBODIMENT

Figure 1:
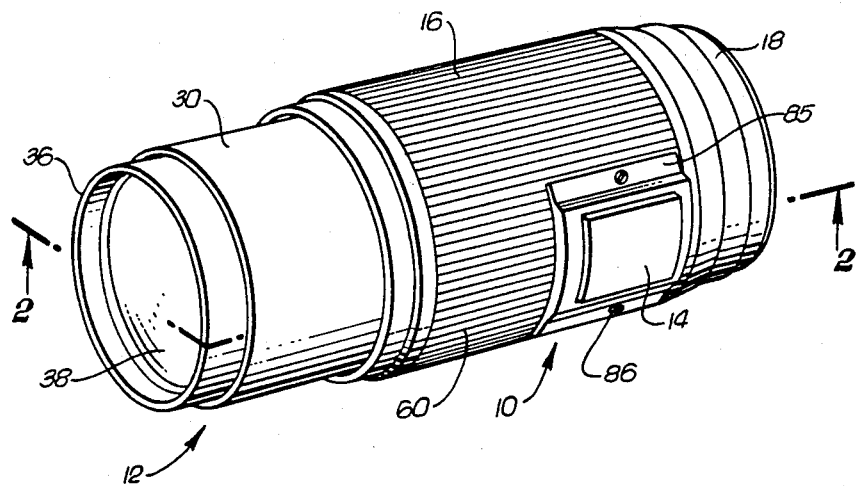
FIG. 1 is a perspective view of a zoom lens including a locking system embodying the novel features of this invention.

As illustrated in the drawings, the invention is embodied in a locking system designated generally by the reference numeral 10 for use in locking a zoom lens 12 in a selected position of magification adjustment. As shown in FIG. 1, the locking system 10 includes a button 14 mounted in an accessible position on the operating ring 16 of the zoom lens, and this button is selectively moved by the photographer between a first position locking the operating ring 16 in a selected axial position of adjustment to fix the magnification setting and a second position unlocking the operating ring to permit axial sliding movement of the ring and thereby allow alteration of the magnification setting.

The general construction and operation of the zoom lens 12 is generally conventional in form, with the addition of the locking system 10 of this invention. More particularly, with reference to FIGS. 1 and 2, the zoom lens 12 comprises a multiple component lens housing adapted for mounting upon a camera. The various portions of the lens housing carry a plurality of optical elements which cooperate with each other to form a so-called telephoto lens for producing a large image of a distant object. The housing portions are coupled for mechanical movement with respect to each other to alter the relative positions of the optical elements for purposes of adjusting the image focus and the image magnification.

The exemplary zoom lens 12 is shown to include a generally cylindrical fixed housing portion 18 at the rear of the lens wherein this fixed housing portion 18 is appropriately sized and shaped for mounting upon the front of a camera (not shown). This fixed housing portion 18 normally supports one or more optical elements 19 in close fixed relation to the camera. If desired, this fixed housing portion may support a variety of conventional auxiliary equipment, such as adapter rings to permit mounting upon particular brands and types of cameras and/or aperture setting apparatus or the like. However, the auxiliary equipment does not form an integral part of the locking system 10 of this invention, whereby such auxiliary equipment is not shown or described herein.

The fixed housing portion 18 is securely connected to a cylindrical sleeve 20 which projects forwardly toward the front of the zoom lens. The forwardmost end of this sleeve is connected by set screws 22 or the like to an annular collar 24 mounted about the front end of the sleeve. A radially enlarged annular boss 25 is formed at the rear end of the collar 24 to have a radially outwardly presented circumferential track 26 for engagement with the mating and radially inwardly presented track 28 of a revolving housing portion 30.

The revolving housing portion 30 has a sleevelike geometry to project forwardly from the annular boss 25 in radially spaced relation with a substantial portion of the collar 24 and to define a radially inwardly presented spiraled track 32. This latter track 32 threadably engages a mating spiraled track 34 of a cylindrical casing 36 in which a forwardmost optical element 38 of the zoom lens is mounted. Importantly, as shown in FIG. 2, the casing 36 includes a longitudinal or axially extending slot 40 for reception of a guide pin 42 mounted on the sleeve 20 to prevent rotation of the cylindrical casing with respect to the sleeve 20 and fixed housing portion 18.

The forwardmost optical element 38 constitutes a focusing element for the zoom lens 12. This focusing element is axially displaceable with respect to the fixed housing portion 18, and thus also with respect to the camera (not shown), by rotating the revolving housing portion 30 with respect to fixed annular collar 24. Such rotation causes the nonrotating cylindrical casing 26 to advance or retract axially with respect to the revolving housing portion and thereby adjust the axial position of the focusing element 38 for focusing purposes.

Figure 2:
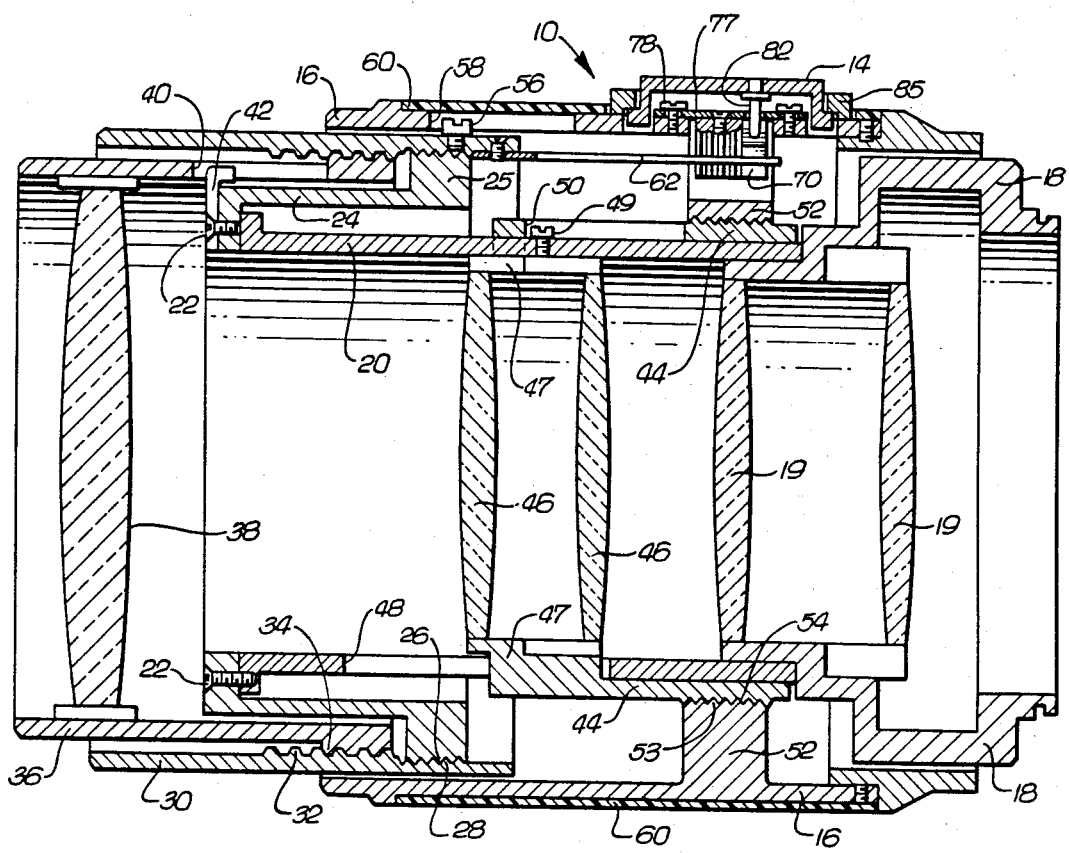
FIG. 2 is a longitudinal section of the zoom lens taken generally on the line 2—2 of FIG. 1.

The zoom lens 12 further includes an axially sliding housing portion 44 carrying at least one zoom optical element 46, with two elements 46 being illustrated in FIG. 2. As shown, this axially sliding housing portion 44 is carried about the fixed sleeve 20 for relatively smooth and wobble-free axial sliding motion. The housing portion 44 includes radially inwardly projecting tabs 47 which extend through aligned axially extending slots 48 in the sleeve to provide appropriate mounting bases for the zoom elements 46. The zoom elements 46 may thus be shifted in position axially with respect to the fixed housing portion 18 and the focusing element 38 to adjustably select the image magnification setting, all in a well-known manner. The extent of permitted axial motion of the zoom elements 46 is limited by the lengths of the slots 48 and can be further limited by a stop screw 49 carried by the sleeve 20 within an axial slot 50 in the sliding housing portion 44.

The image focus and image magnification functions are typically combined into the operating ring 16. More specifically, the operating ring 16 comprises an axially elongated collar mounted about the remaining housing portions for rotational movement with respect to the fixed and sliding housing portions 18 and 44, and for axially sliding movement with respect to the fixed and revolving housing portions 18 and 30. In this manner, the operating ring can be rotated to rotate the revolving housing portion 30 and thereby adjustably set the image focus independent of the magnification setting. Alternatively, the operating ring can be moved axially to adjust the position of the sliding housing portion 44 and thereby adjustably select the image magnification independent of the focus setting.

The exemplary operating ring 16 has a radially inwardly projecting flange 52 with a radially inwardly presented circumferential track 53 in mating engagement with a corresponding and radially outwardly presented track 54 on the sliding housing portion 44. Thus, the operating ring 16 is rotationally movable with respect to the sliding housing portion 44, but axial movement of the operating ring 16 carries the sliding housing portion through a corresponding axial motion to adjust magnification setting. This axial motion of the operating ring 16 is permitted with respect to the revolving housing portion 30 by means of a stop screw 56 on the revolving housing portion received within an axially extending slot 58 in the operating ring. However, rotational movement of the operating ring about the sliding housing portion 44 causes a side margin of the ring slot 58 to engage the stop screw 56 to cause rotation of the revolving housing portion 30 and corresponding adjustment of image focus. Conveniently, a knurled or roughened outer wrap 60 is carried out the operating ring 16 to hide the slot 58 from view and to provide a rough exterior surface for easy grasping of the ring during sliding and/or rotational movements.

The locking system 10 of this invention is provided for selectively locking the operating ring 16 against axial displacement with respect to the remaining housing portions of the zoom lens in order to fix the zoom elements 46 in the selected magnification setting. The locking system 10 therefore provides a substantial improvement over conventional zoom lenses of the prior art in that the magnification setting cannot be altered until the locking system is moved to an unlocked condition to permit axially sliding motion of the operating ring. The magnification thus cannot be altered inadvertently as a result of bumping or in response to gravitational and/or centrifugal forces encountered during handling and use of the zoom lens.

A preferred form of the locking system 10 is shown in detail in FIGS. 2-7. More particularly, the locking system comprises an axially elongated rack 62 having one end mounted as by screws 63 to the rear end of the revolving housing portion 30. The rack 62 projects rearwardly toward and extends through an axially extending opening 64 in the flange 52 of the operating ring 16. Importantly, the rack includes an axially spaced and laterally projecting plurality of teeth 66 formed along one side thereof.

The rack teeth 66 are disposed for locking engagement by a pair of teeth 68 of a ratchet 70 movably mounted on the operating ring 16. This ratchet 70 is positioned within a generally T-shaped opening 72 in the operating ring 16 and is connected by a screw 73 to a leaf spring 74 which reacts against a margin 75 of the opening 72 to urge the ratchet in a lateral direction into locking engagement with the rack 62. The ratchet is further supported with respect to the operating ring 16 by a screw 76 fastened through an overlying mounting plate 77 which is in turn connected to the operating ring 16 by a pair of screws 78 received through laterally elongated slots 79 in the mounting plate. Conveniently, these latter screws 78 do not fasten tightly through the slots 79 whereby the ratchet 70 is laterally movable with respect to the rack 62 within limits defined by the slots 79.

The ratchet 70 is shaped to include a cam surface 80 presented angularly in a generally radially outward direction and generally facing toward the toothed rack 62. This cam surface 80 is disposed for engagement by a radially inwardly projecting control pin 82 carried by the button 14. Accordingly, depression of the button 14 moves the control pin 82 radially inwardly into engagement with the cam surface 80, whereby the control pin pushes downwardly and laterally upon the ratchet 70 to retract the ratchet from locking engagement with the rack 62. Conversely, movement of the button 14 in a radially outward direction allows the leaf spring 74 to return the ratchet into locking engagement with the rack.

The button 14 is mounted on the operating ring 16 for spring-biased movement of the control pin 82 through a laterally extending slot 83 in the mounting plate 77 into contact with the cam surface 80. More specifically, the button 14 comprises a generally rectangular member sized to protrude through an opening 84 in a rectangular shroud 85 mounted on the operating ring 16 by a pair of set screws 86. The button 14 includes a pair of longitudinally projecting tabs 88 at its opposite ends, and these tabs are sized to engage the underside of the shroud 85 to prevent removal of the button. A plurality of small compression springs 90 react between the operating ring 16 and the button to urge the button toward a normal radially outward position with the tabs 88 engaging the shroud 85. In this position, the control pin 82 is oriented to allow the leaf spring 74 to move the ratchet 70 into locking engagement with the rack 62.

The button 14 is manually depressed against the forces of the compression springs 90 to move the control pin 82 downwardly against the ratchet cam surface 80. This movement retracts the ratched from locking engagement with the rack to permit alteration of the magnification setting of the zoom lens. When the alternative magnification setting is reached, the button 14 is released to once again permit the ratchet to move into locking engagement with the rack and thereby lock the operating ring against axial sliding movement.

A modified form of the locking system of this invention is illustrated in FIGS. 8-11 to include a lock-release switch for selectively maintaining the operating ring in an unlocked condition. Conveniently, for ease of description and clairty of understanding, components shown in FIGS. 8-11 and common to the embodiment of FIGS. 2-7 are designated by common primed reference numerals.

As shown in FIGS. 8-11, a modified button 114 is positioned within a shroud 85' and supports a control pin 82' for engagement with a cam surface 80' of a ratchet 70' to move the ratchet out of locking engagement with a toothed rack 62'. When the button 114 is depressed against the forces of a plurality of compression springs 90', the button 114 is thus movable in the same manner as the button 14 in FIGS. 2-7 between one position with the operating collar 16' of the zoom lens locked against axial displacement with respect to a revolving housing portion 30', and another position with the operating collar 16' unlocked to permit adjustment of the axial position.

Figure 8:
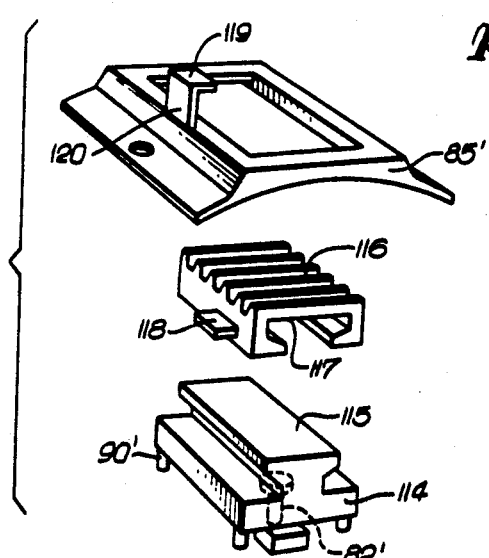
FIG. 8 is an enlarged exploded perspective view illustrating an alternative embodiment of the locking system.
Figure 9:
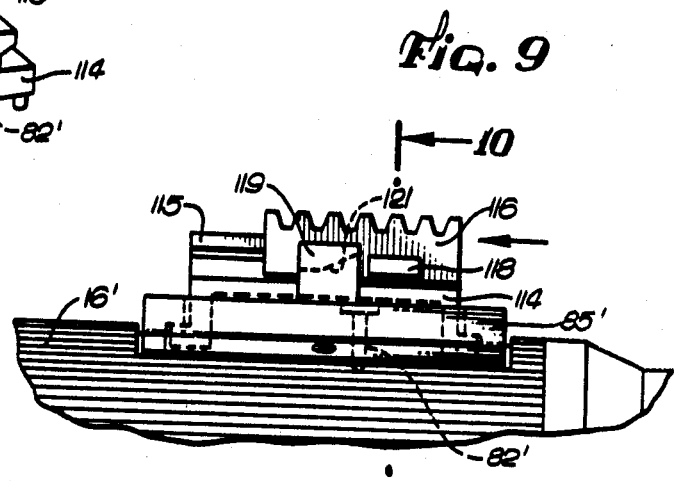
FIG. 9 is a fragmented longitudinal section generally similar to FIG. 3 and illustrating the alternative embodiment of FIG. 8 in one position of operation.
Figure 10:
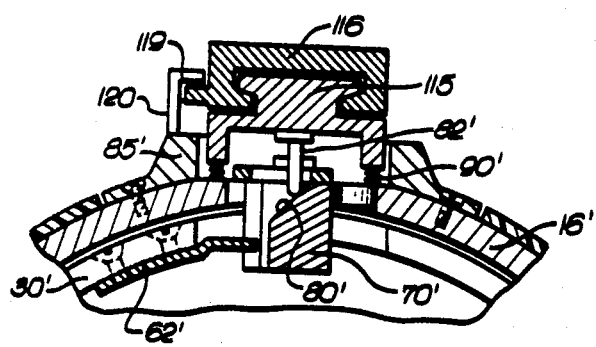
FIG. 10 is a fragmented transverse vertical section taken generally on the line 10—10 of FIG. 9.
Figure 11:
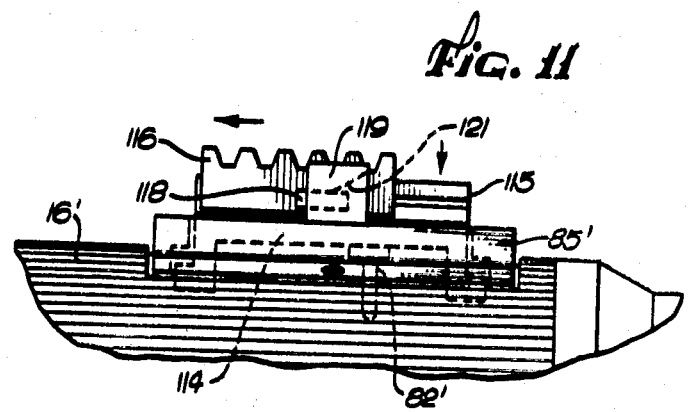
FIG. 11 is a fragmented longitudinal section generally similar to FIG. 9 and illustrating the alternative embodiment in a second position of operation.

The modified button 114 is shaped to include a longitudinally extending and upstanding head 115 having a generally dovetail-shaped cross section, as viewed in FIGS. 8 and 10. This head 115 slidably carries a lock-release switch 116 which has a generally dovetail-shaped recess 117 for longitudinal sliding reception onto the button head. Importantly, the lock-release switch 116 further includes a laterally projecting lug 118 oriented for engagement with a cam tab 119 carried at the upper end of a post 1120 formed at one side of the shroud 85'.

The lock-release switch 116 is slidably movable on the button head 115 to move the lug 118 into and out of engagement with the cam tab 119. More particularly, when the switch 116 is moved to a position with the lug 118 and cam tab 119 out of engagement with each other, as viewed in FIGS. 9 and 10, the button 114 may be operated in the same manner as the button 14 described in FIGS. 2-7 to selectively lock and unlock the operating ring 16' against axial displacement. However, when the lug 118 is moved into engagement with the cam tab 119, the lug 118 bears against and slides down a downwardly angled ramp 121 on the cam tab 119 to a position underneath the tab, as viewed in FIG. 11. This movement urges the button 114 to the depressed position to unlock the operating ring 16' and to maintain the ring 16' in the unlocked condition until the lock-release switch 116 is returned to a position with the lug 118 out of engagement with the cam tab 119. The lock-release switch 116 thus permits the locking system of this invention to be disabled when desired for normal unrestricted axial sliding motion of the operating ring.

The locking system of this invention thus provides relatively simple and inexpensive apparatus for selectively locking a zoom lens in a fixed magnification setting. The locking system is quickly and easily moved to an unlocked condition to permit rapid adjustment of the magnification setting whenever desired.

A variety of modifications and improvements to the invention described herein are believed to be apparent to one skilled in the art. Accordingly, no limitation on the invention is intended, except as set forth in the appended claims.

What is claimed is:

1. A locking system for releasably locking relatively movable housing portions of a photographic lens in a selected position of adjustment with respect to each other, comprising:
   a first locking member on one housing portion, said first locking member including a rack having a plurality of teeth formed thereon;
   a second locking member mounted on another housing portion, said second locking member including a ratchet having at least one tooth for locking engagement with said rack teeth and movable between a first position in positive locking engagement with said first locking member to lock the housing portions against movement relative to each other and a second position out of locking engagement with said first locking member to permit movement of the housing portions relative to each other;
   spring means for urging said second locking member into locking engagement with said first locking member; and
   means for engaging said second locking member for selectively moving said second locking member out of engagement with said first locking member, said engaging means including a control pin mounted on said another housing portion for movement into engagement with said second locking member, and support means for normally positioning said control pin in a retracted position with respect to said second locking member;
   said support means including a button member carrying said control pin, and biasing means for urging said button member to a normal position with said control pin in said retracted position.

2. The locking system of claim 1 wherein said ratchet has a cam surface formed thereon, said control pin being engageable with said cam surface for selectively moving said ratchet out of engagement with said rack.

3. The locking system of claim 1 including switch means for selectively holding said second locking member in said second position.

4. The locking system of claim 1 wherein the relatively movable housing portions comprise generally cylindrical housing portions of a zoom lens movable axially relative to each other to adjust the magnification setting of the zoom lens.

5. A locking system for releasably locking generally cylindrical and relatively axially movable housing portions of a photographic lens in a selected position of adjustment relative to each other, comprising:
   a first toothed locking member on one housing portion;
   a second toothed locking member mounted on the other housing portion for movement between a locked position in positive locking engagement with said first toothed locking member to lock the housing portions against relative axial movement with respect to each other and an unlocked position retracted from locking engagement with said first toothed locking member to permit relative axial movement of the housing portions;
   spring means for urging said second toothed locking member to said locked position, said second toothed locking member being manually movable to said unlocked position; and
   means for engaging said second locking member for selectively moving said second locking member out of engagement with said first locking member, said engaging means including a control pin mounted on said another housing portion for movement into engagement with said second locking member, and support means for normally positioning said control pin in a retracted position with respect to said second locking member;
   said support means including a button member carrying said control pin, and biasing means for urging said button member to a normal position with said control pin in said retracted position.

6. The locking system of claim 5 wherein the housing portions comprise an axially fixed housing portion and an axially slidable housing portion of a zoom lens, said axially slidable housing portion being axially movable with respect to said axially fixed housing portion to adjust the magnification setting of the zoom lens.

7. The locking system of claim 5 wherein said first locking member comprises a toothed rack, and wherein said second locking member comprises a toothed ratchet.

8. The locking system of claim 5 including switch means for selectively holding said second locking member in said unlocked position.

9. A locking system for releasably locking relatively movable housing portions of a photographic lens in a selected position of adjustment with respect to each other, comprising:
   a first locking member on one housing portion;
   a second locking member mounted on another housing portion for movement between a locked position in positive locking engagement with said first locking member to lock the housing portions against movement relative to each other and an unlocked position retracted from locking engagement with said first locking member to permit relative movement of the housing portions;

first spring means for urging said second locking member to said locked position;

control means on said another housing portion and movable into engagement with said second locking member to move said second locking member to said unlocked position; and second spring means for urging said control means toward a position retracted from engagement with said second locking member to permit said first spring means to urge said second locking member to said locked position.

10. The locking system of claim 9 wherein said second locking member has an angularly oriented cam surface formed thereon, and wherein said control means comprises a depressable button having a pin thereon for engaging said cam surface when said button is depressed to move said second locking member to said unlocked position, said second spring means being for urging said button toward a nondepressed position with said pin retracted from said cam surface.

11. The locking system of claim 10 including means selectively engageable with said button for releasably locking said button in said nondepressed position.

12. A locking system for releasably locking inner and outer generally cylindrical and axially movable housing portions of a photograhic lens in a selected position of adjustment relative to each other, comprising:
a toothed rack mounted on the inner housing portion;
a toothed ratchet mounted on the outer housing portion for movement between a locked position in engagement with said toothed rack to lock the housing portions against relative axial movement and an unlocked position disengaged from said rack to permit relative axial movement of the housing portions;
a spring reacting between the outer housing portion and said ratchet for urging said ratchet toward said locked position;
button means on the outer housing portion movable to a depressed position for engaging said ratchet and for moving said ratchet to said unlocked position; and
means for urging said button means to a normal nondepressed position retracted from said ratchet.

13. The locking system of claim 12 wherein said rack has a plurality of axially spaced and laterally projecting teeth, and wherein said ratchet has at least one tooth projecting laterally for engagement with said rack teeth.

14. The locking system of claim 12 including means for mounting said ratchet on the outer housing portion for movement between said locked and unlocked positions, and means for mounting said button means on the outer housing portion for movement between said depressed and nondepressed positions.

15. The locking system of claim 12 including switch means for selectively locking said button means in a depressed position.

16. The locking system of claim 13 wherein said ratchet has a cam surface formed thereon and oriented angularly in a direction presented generally radially outwardly and laterally toward said rack, said button means being mounted generally in radial alignment with said cam surface and including a pin for engaging said cam surface when said buttom means is depressed.

17. The locking system of claim 14 wherein said ratchet mounting means comprises a mounting plate secured to said ratchet and having a pair of laterally elongated slots formed therein, and a pair of fasteners receivable relatively loosely through said slots and secured to the outer housing portion, whereby said mounting plate and said ratchet are laterally movable.

18. The locking system of claim 15 wherein said switch means includes a slide switch mounted for sliding movement on said button means and having a laterally projecting lug formed thereon, and a locking post including a laterally projecting tab fixedly mounted on said outer housing portion, said slide switch being movable to a position with said lug retained at the radially inner side of said tab to hold said button means in said depressed position.

19. A zoom lens, comprising:
an inner, generally cylindrical housing portion;
an outer, generally cylindrical housing portion mounted about said inner housing portion for axial sliding movement relative thereto, said outer housing portion carrying a zoom optical element for axial movement to adjust the magnification setting of the zoom lens;
a first toothed locking member on said inner housing portion;
a second toothed locking member mounted on said outer housing portion for movement between a locked position in engagement with said first locking member to lock said inner and outer housing portions against relative axial movement and an unlocked position retracted from engagement with said first locking member to permit relative axial movement of said inner and outer housing portions;
spring means for urging said second locking member toward said locked position;
button means on said outer housing portion and movable to a depressed position for engaging said second locking member and for moving said second locking member to said unlocked position; and
means for urging said second locking member to a normal nondepressed position disengaged from said second locking member.

20. The zoom lens of claim 19 including switch means for selectively holding said second locking member in said unlocked position.

21. The zoom lens of claim 20 wherein said switch means includes a slide switch mounted for sliding movement on said button means and having a laterally projecting lug formed thereon, and a locking post including a laterally projecting tab fixedly mounted on said outer housing portion, said slide switch being movable to a position with said lug retained at the radially inner side of said tab to hold said button means in said depressed position.

22. The zoom lens of claim 21 wherein said ratchet has an angularly oriented cam surface formed thereon, said button means being engageable with said cam surface to move said ratchet to said unlocked position.

23. A zoom lens, comprising:
a first generally cylindrical housing portion adapted for connection to a camera;
a second generally cylindrical housing portion mounted for rotational movement with respect to said first housing portion, said second housing portion including a focusing optical element and means for adjusting the axial position of said focusing element in response to rotational movement of said second housing portion;

a third generally cylindrical housing portion mounted for axial sliding movement with respect to said first and second housing portions, said third housing portion including at least one zoom element for adjusting the magnification setting of the zoom lens upon axial movement of said third housing portion;

an external generally cylindrical operating ring mounted about said first housing portion and connected to said second and third housing portions for rotational movement with respect to said first and third housing portions to adjust the rotational position of said second housing portion and for axial sliding movement with respect to said first and second housing portions to adjust the axial position of said third housing portion;

a toothed rack carried by said second housing portion;

a toothed ratchet mounted on said operating ring for movement between a locked position in locking enagagement with said rack to lock said ring and said third housing portion against axial movement with respect to said second housing portion, and an unlocked position disengaged from said rack to permit axial movement of said ring and said third housing portion with respect to said second housing portion;

a spring for urging said ratchet to said locked position;

button means mounted on said operating ring for movement between a depressed and nondepressed position, said button means being engageable in said depressed position with said ratchet to move said ratchet to said unlocked position; and means for urging said button means to said nondepressed position.

24. A zoom lens, comprising:

first generally cylindrical housing means adapted for connection to a camera;

second housing means mounted for rotational movement with respect to said first housing means, said second housing means including a focusing optical element and means for adjusting the axial position of said focusing element in response to rotational movement of said second housing means;

third housing means mounted for axial sliding movement with respect to said first and second housing means, said third housing means including at least one zoom optical element for adjusting the magnification setting of the zoom lens upon axial movement of said third housing means;

an external generally cylindrical operating ring mounted about said first housing means and coupled to said second and third housing means for rotational movement with respect to said first and third housing means to adjust the rotational position of said second housing means and for axial sliding movement with respect to said first and second housing means to adjust the axial position of said third housing means;

a first toothed locking member mounted for rotation with said operating ring and said second housing means upon rotation of said operating ring and for relative movement between said operating ring and said first locking member upon axial sliding movement of said operating ring;

a second toothed locking member mounted on said operating ring for movement between a locked position in locking engagement with said first toothed locking member to lock said operating ring and said third housing means against axial movement with respect to said second housing means, and an unlocked position disengaged from said first locking member to permit axial movement of said operating ring and said third housing means with respect to said second housing means; and means for releasably retaining said second locking member in said locked position and in said unlocked position.

25. The zoom lens of claim 24 wherein said retaining means comprises a spring for urging said second locking member normally to said locked position, button means on said operating ring for movement between depressed and nondepressed positions, said button means being engageable in said depressed position with said second locking member to move said second locking member to said unlocked position, means for urging said button means normally to said nondepressed position, and means for selectively locking said button means in said depressed position.

* * * * *